June 23, 1942.  A. C. MISCH  2,287,354
GUIDED PIPE CUTTER
Filed Nov. 27, 1939
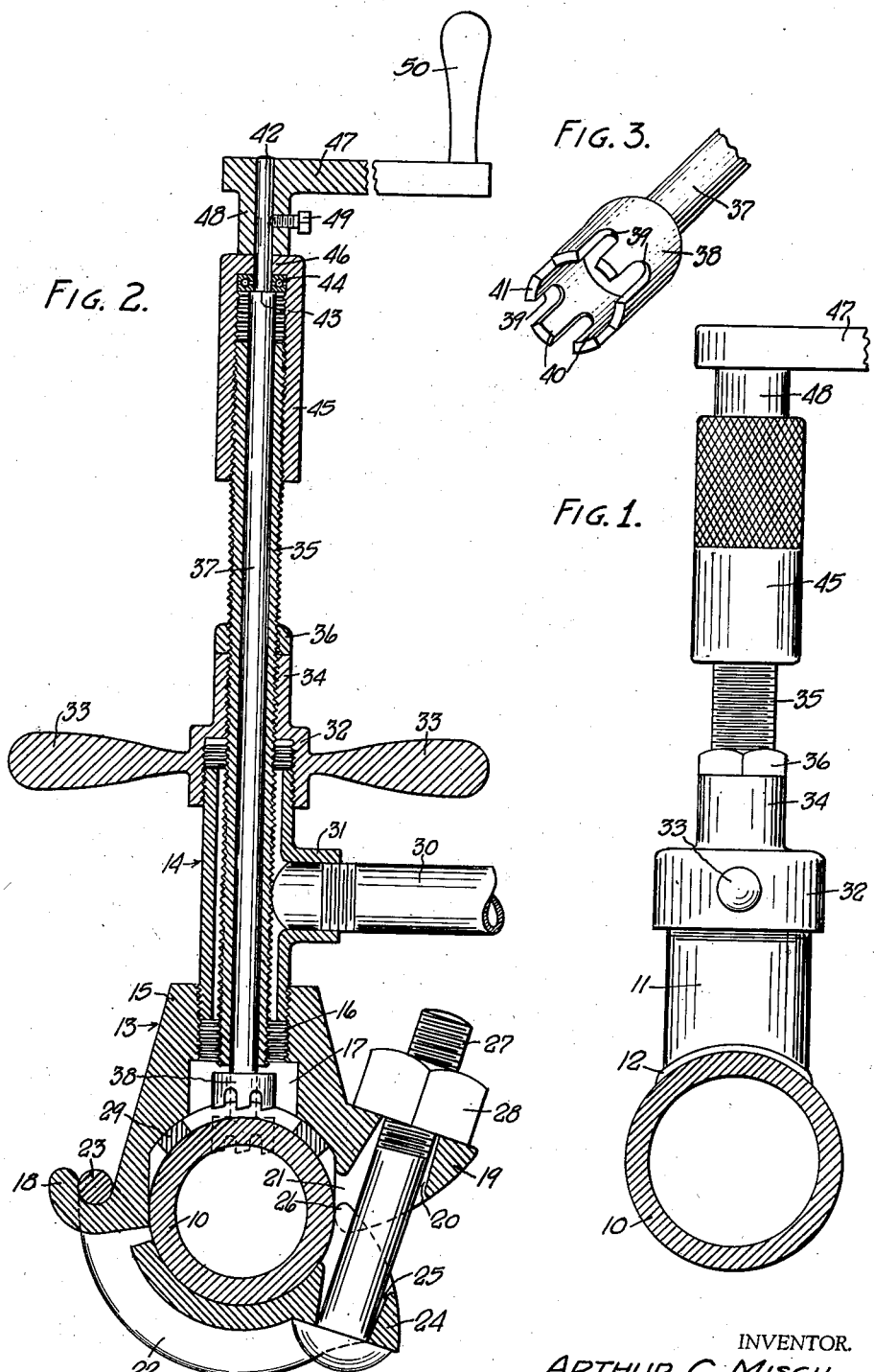
INVENTOR.
ARTHUR C. MISCH.
BY Oltsch & Knoblock
ATTORNEYS.

Patented June 23, 1942

2,287,354

UNITED STATES PATENT OFFICE 2,287,354

GUIDED PIPE CUTTER

Arthur C. Misch, South Bend, Ind., assignor to M. B. Skinner Co., South Bend, Ind., a corporation of Indiana Application November 27, 1939, Serial No. 306,284

8 Claims. (Cl. 77—37)

This invention relates to guided pipe cutters, and more particularly to means for cutting a hole in a pipe for the purpose of connecting a branch line in a fluid system. It is generally considered desirable to use a centerless or annular cutter for the purpose of cutting a hole in a pipe in the use particularly set out. One of the primary reasons for this is that the formation of chips and slivers of metal is substantially avoided, and hence the possibility of interference thereof with valves and other like operating parts of a fluid system is avoided. However, a serious problem is presented in respect to the matter of properly guiding this type of cutter so that it may make an effective cut without danger of breaking the cutter. Thus it has been found that if a centerless cutter is not guided at a point closely adjacent the cutting head so as to restrain vibration thereof, such a cutter is subject to frequent breakage. Consequently, from a practical standpoint, it has generally been considered necessary heretofore to employ a drill type of cutter.

Therefore, it is the primary object of this invention to provide a device of this character having means closely adjacent the cutting head for guiding the same and restraining vibration thereof for the purpose of avoiding breakage of the cutter.

A further object of this invention is to provide a device of this character which is adaptable to various constructions of branch pipes and branch pipe fittings, and which is readily adjustable.

A further object is to provide a device of this character wherein the guide means for the cutter may be adjusted with respect to the means for mounting the same upon a pipe member.

A further object is to provide a device of this character which will be simple in construction and operation, and inexpensive.

Other objects will be apparent from the description and appended claims.

In the drawing:

Fig. 1 is a view of the device in side elevation applied to one type of branch connector mounted on the pipe to be cut.

Fig. 2 is a longitudinal vertical sectional view of the device applied to a different type of branch connector mounted on the pipe to be cut.

Fig. 3 is a fragmentary perspective view illustrating a cutter head.

In the drawing, which illustrates the preferred embodiment of the invention, the numeral 10 designates the pipe to be cut. Various types of branch connectors may be employed with the pipe. For example, in Fig. 1 is illustrated a type wherein a standard pipe 11 is welded to pipe 10 at 12. In Fig. 2 a modified branch connector mounting is illustrated. The Fig. 2 connector involves the utilization of a saddle clamp 13 to which a T connector 14 is secured. As here illustrated, the saddle preferably comprises a head 15 provided with a threaded bore 16 centrally thereof, said head being provided with a concave inner portion of substantially semi-cylindrical contour at which a recess 17, communicating with threaded bore 16, opens.

The saddle head 15 is provided an integral hook portion 18 at one side thereof, and its opposite side is provided with an extension 19 provided with a tapering opening 20. One or more teeth 21 project downwardly from projection 19 adjacent pipe 10 and opposite hook 18. A curved clamp part 22 which cooperates with head 15 to form the saddle fitting, is provided at one side with a portion 23 adapted for hooked pivotal engagement with hook 18, and is provided at its opposite side with a projection 24 having a tapering aperture 25. One or more tooth parts 26 project upwardly from projection 24 and are adapted for interdigital relation with the projections 21 of the head portion of the saddle. Draw bolt 27 is extended through the openings 20 and 25, and a nut 28 serves to draw the clamp part 22 into clamping relation to head 15 with respect to pipe 10. A suitable gasket ring 29 is positioned between the head 15 and pipe 10 in substantially concentric relation to said head for the purpose of effecting a seal between the saddle and the pipe marginally of chamber 17. The T-connector 14 has one of its ends threaded in the threaded bore 16, and a branch conduit 30 is threaded into the base portion 31 of the T.

My device is adapted to be employed with each of the two above mentioned types of branch type connector, and also with other conventional types. It comprises a cap member 32 which is internally screw threaded and is preferably provided with laterally projecting handles 33 by means of which the cap may be threaded on the connectors 11, 14 or the like. Cap 32 is provided with an integral concentric projecting sleeve or collar 34 which is of reduced dimension, and is internally screw threaded. An elongated externally screw threaded guide sleeve 35 is threaded in the collar 34 of cap 32. The dimensions of the parts are such that the sleeve 35 may pass freely through the connector 11 or 14 upon which cap 32 is mounted. A suitable lock nut 36 may be threaded on sleeve 35 to bear against the end of collar 34, and thus serve to maintain the guide sleeve 35 in stationary position with respect to the collar 32 and the branch connector 11 or 14. An elongated shaft 37 fits snugly in the guide sleeve 35 with sufficient clearance to permit rotation thereof in said sleeve without permitting any lateral play or vibration of said shaft within said sleeve. At its lower end the shaft 37 mounts an annular or centerless cutter head 38 of any suitable construction. As here illustrated said head comprises a cylindrical body portion open at its free end and provided with a plurality of longitudinally extending kerfs 39 projecting inwardly from its open end to define cutter teeth 40 whose outer edges 41 may be shaped as desired for cutting purposes, and preferably are inclined with respect to a plane transverse of the cutter head 38.

The opposite end of the shaft 37 terminates in a reduced diameter portion 42 which forms a shoulder 43 on which a suitable bearing 44 is supported. An internally screw threaded collar 45 is provided with an annular inturned flange 46 at its upper end adapted to bear upon the bearing 44 and to have reduced shaft portion 42 extend therethrough. Collar 45 has a threaded connection with sleeve 35. An operating arm 47 provided with a hub extension 48 is mounted upon the reduced end portion of shaft 42, and is locked thereto by means of a set screw 49. The end of projection 48 is positioned adjacent the inturned flange 46 of collar 45 to retain said collar in substantially uniform relation to the shaft 37. An operating handle 50 may be provided on the end of the arm 47.

The application and use of the device is as follows: Assuming that a suitable connector, as illustrated at 11 or 14, has been operatively connected with the pipe 10 in sealed relation thereto at the point at which the pipe 10 should be cut to effect a connection of a branch pipe, as 30, with the main pipe 10; my device is applied thereto as a unit. Prior to this application it will be desirable to adjust the sleeve 35 with respect to the cap 32 in such a position that the sleeve 35 will extend adjacent the pipe 10, leaving a clearance between the end of the sleeve and said pipe sufficient for a certain limited extent of free movement of the cutter 38 to and from pipe 10, as illustrated in Fig. 2. Cap 32 is then operatively mounted on the connector 11 or 14 as illustrated, and the device is ready for use. The bearing 44 serves to permit free rotation of the shaft 37 by means of the operating arm 47, and it is generally desirable to arrange and proportion the parts so that said arm 47 may be spun with one hand by an operator. In this way, the other hand of the operator is left free to manipulate the collar 45 for the purpose of slowly feeding the shaft 37 downwardly so that the cutter 38 may first approach and then be permitted to bite into the pipe 10. Thus one man may readily operate the device and control the rate at which the cutting head 38 attacks and bites into the pipe. It will be understood, of course, that the connector 14 which is employed must be of a size having an internal dimension slightly greater than the size of the hole which is to be cut in the pipe 10, so that the cutter 38 may pass freely through said connector when the device is applied and when it is removed.

It will be observed from the construction of the device that the means which anchors the same to the connector, namely the cap 32, is positioned at a substantial distance from the point at which the cutting head 38 does its work. By providing the sleeve 35 adjustable with respect to said cap so that it may extend close to the point at which the cutter head is working, the shaft 37 is both guided and restrained against vibration during the cutting operation. This, of course, is achieved without in any way interfering with the free rotation of the shaft 37 as is required for the cutting operation. Without such guiding means, a centerless cutter attacking the curved outer surface of the pipe, and having each of the teeth 40 thereof only in intermittent engagement with the pipe to be cut, would set up such a vibration in the shaft 37 that the cutter head would almost certainly be broken before the head could cut through the pipe. This vibration is entirely avoided by the extension of sleeve 35 to a position adjacent the cutter head, to rigidify the free depending portion of said shaft 37 with respect to cap 32.

It will be observed also that the cutter head 38 is so constructed that it is positioned within the opening which it cuts at the time when said opening has been completely formed, as is best illustrated in dotted lines in Fig. 2. Hence it is possible by simply rotating the collar 45 in withdrawing direction to withdraw the cutter from the opening which it forms without binding of parts or encountering any difficulty. The unit may then be easily disconnected from the branch connector by disconnecting cap 32 from said connector. After removal of the device, the upper end of the connector, in the case of 14, may be capped and sealed in any suitable manner; or in the case of the connector 11, a connection can be effected between the said connector and a branch pipe.

It will also be observed that the adjustability of the device is of particular importance, and that a cutter head of any desired size may readily be applied to the device by simply releasing the set screws 49 to withdraw shaft 37 and thence replacing said shaft with another having a cutter of desired size.

Another advantage of the device is that, by the provision of a set of caps 32 of varying sizes but each having a collar 34 of the same interior dimension, the device may be adapted to many different types and sizes of connectors.

It will be readily apparent that various other embodiments which utilize the principle and the spirit of the invention may be made, and I contemplate all such that fall within the scope of the appended claims.

I claim:

1. A pipe tapping device adapted to be mounted on a branch connector secured to a pipe to be tapped, comprising, a shaft, a cutter mounted on one end of said shaft, an elongated externally screw threaded sleeve snugly receiving said shaft for rotation therein, a member adapted to be mounted on said connector and having a threaded connection with said sleeve whereby said sleeve may be advanced within said connector and relative to said pipe, and a member screw threaded on said sleeve for adjusting the position of said shaft longitudinally of said sleeve.

2. A pipe tapping device adapted to be mounted on a branch connector secured to a pipe to be tapped, comprising, an anchor member adapted to be mounted on said connector, an elongated tubular member carried by and longitudinally adjustable relative to said anchor member and extending within said connector, a shaft journaled in and having a guided bearing engagement with said tubular member throughout the length of said tubular member, a cutter on one end of said shaft, means for adjusting the position of said shaft in said tubular member, and means for rotating said shaft.

3. A pipe tapping device as defined in claim 2, wherein said anchor member includes an internally screw threaded cap having a collar concentric therewith in which said tubular member is threaded.

4. A pipe tapping device as defined in claim 2, wherein said shaft has a shoulder, and a bearing seated on said shoulder, said adjusting means engaging said bearing.

5. A pipe tapping device as defined in claim 2, wherein said shaft has a shoulder and said adjusting means is screw-threaded on said tubular member and has a bearing portion positioned between said shoulder and said shaft rotating means against which said shoulder bears.

6. In a device of the character described, anchor means adapted for stationary connection with a pipe to be cut to provide a chamber defined in part by said pipe, a guide tube mounted on said anchor to extend within said chamber and adjustable to and from said pipe, a shaft, said guide tube having a bore journaling and guiding said shaft, a cutter on said shaft, means for rotating said shaft, and means adjustable longitudinally of and supported by said tube for positioning said shaft in said tube.

7. In a device for tapping a pipe and adapted to be mounted on a branch pipe connector secured to said pipe, an anchor member secured to said connector, a guide tube adjustably mounted on said anchor member and projecting into said connector to terminate adjacent said pipe, a shaft journaled in said tube and mounting a cutter, means for rotating said shaft, and means for shifting said shaft longitudinally of said tube.

8. In a device for tapping a pipe adapted to be mounted on a branch pipe connector secured to said pipe, a cap secured to said connector, an internally threaded collar projecting concentrically from said cap, an elongated externally threaded tube threaded in said collar and projecting into said connector to terminate adjacent said pipe, means for locking said tube in adjusted position relative to said collar, an elongated shaft fitting snugly and rotatably in said tube throughout the length of said tube, an annular cutting head on said shaft, said shaft having a shoulder, a bearing supported on said shoulder, an internally threaded adjusting member threaded on said tube and having an inturned flange engaging said bearing, and an operating member fixed on said shaft adjacent said flange.

ARTHUR C. MISCH.